US012640100B2

(12) United States Patent
Kim et al.

(10) Patent No.: US 12,640,100 B2
(45) Date of Patent: May 26, 2026

(54) DISPLAY DEVICE AND METHOD OF DRIVING THE SAME USING REFRESH-RATE-DEPENDENT ENABLE SCAN SIGNAL WIDTH

(71) Applicant: SAMSUNG DISPLAY CO., LTD., Yongin-si (KR)

(72) Inventors: Sung Jin Kim, Yongin-si (KR); Si Beak Pyo, Yongin-si (KR); Young Uk Hwang, Yongin-si (KR); Sang Hyuk Shim, Yongin-si (KR); Seung Hyuk Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/733,315

(22) Filed: Jun. 4, 2024

(65) Prior Publication Data

US 2025/0124881 A1 Apr. 17, 2025

(30) Foreign Application Priority Data

Oct. 12, 2023 (KR) ........................ 10-2023-0136139

(51) Int. Cl.
*G09G 3/3266* (2016.01)
*G09G 3/3233* (2016.01)

(52) U.S. Cl.
CPC ......... *G09G 3/3266* (2013.01); *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01); *G09G 2340/0435* (2013.01)

(58) Field of Classification Search
CPC ... G09G 3/30–3291; G09G 2300/0819; G09G 2300/0842; G09G 2300/0861; G09G 2310/08; G09G 2320/0233; G09G 2320/0626; G09G 2340/0435
See application file for complete search history.

(56) References Cited

U.S. PATENT DOCUMENTS

| | | | |
|---|---|---|---|
| 9,823,729 | B2 | 11/2017 | An et al. |
| 11,037,506 | B2 | 6/2021 | Noh et al. |
| 11,217,149 | B2 | 1/2022 | In et al. |

(Continued)

FOREIGN PATENT DOCUMENTS

| | | | |
|---|---|---|---|
| KR | 10-2020-0040344 | A | 4/2020 |
| KR | 10-2020-0075945 | A | 6/2020 |

(Continued)

*Primary Examiner* — Keith L Crawley
(74) *Attorney, Agent, or Firm* — F. CHAU & ASSOCIATES, LLC

(57) ABSTRACT

A display device includes at least one pixel configured to receive a voltage of an initialization power source, which is supplied to an anode electrode of a light emitting element, when an enable scan signal is supplied to a scan line, and a scan driver. The scan driver is configured to supply the enable scan signal to the scan line. The enable scan signal supplied to the scan line by the scan driver has a same width during an active area of a frame regardless of an image refresh rate, and the width of the enable scan signal supplied to the scan line is changed by the scan driver during a blank area of the frame, corresponding to the image refresh rate.

18 Claims, 12 Drawing Sheets

(56) References Cited

U.S. PATENT DOCUMENTS

| | | | | |
|---|---|---|---|---|
| 11,315,489 | B1 * | 4/2022 | Heganovic | G09G 3/3283 |
| 11,626,074 | B2 | 4/2023 | Roh et al. | |
| 11,769,456 | B2 | 9/2023 | Choe et al. | |
| 2018/0261163 | A1 * | 9/2018 | Hyun | G09G 3/003 |
| 2020/0243008 | A1 * | 7/2020 | Lee | H10D 30/6745 |
| 2021/0134210 | A1 * | 5/2021 | In | G09G 3/2092 |
| 2022/0335872 | A1 * | 10/2022 | Zhang | G09G 3/3233 |
| 2023/0005431 | A1 * | 1/2023 | Choe | G09G 3/3275 |
| 2023/0088642 | A1 * | 3/2023 | Jin | G09G 3/3266<br>345/699 |
| 2023/0215360 | A1 * | 7/2023 | Kim | G09G 3/3266 |
| 2023/0230535 | A1 * | 7/2023 | Hu | G09G 3/3266<br>345/55 |
| 2023/0335045 | A1 * | 10/2023 | Hu | G09G 3/32 |
| 2024/0078972 | A1 * | 3/2024 | Zhang | G09G 3/3233 |
| 2024/0144859 | A1 * | 5/2024 | Zhang | G09G 3/32 |
| 2024/0161705 | A1 * | 5/2024 | Sang | G09G 3/3233 |
| 2024/0212565 | A1 * | 6/2024 | Kim | G09G 3/3266 |
| 2024/0249672 | A1 * | 7/2024 | Kuang | G09G 3/32 |
| 2024/0355287 | A1 * | 10/2024 | Tanaka | G09G 3/3233 |
| 2024/0404474 | A1 * | 12/2024 | Li | G09G 3/3233 |

FOREIGN PATENT DOCUMENTS

| | | | |
|---|---|---|---|
| KR | 10-2021-0054114 | A | 5/2021 |
| KR | 10-2288351 | B1 | 8/2021 |
| KR | 10-2023-0007609 | A | 1/2023 |

* cited by examiner

<SSP>

DISPLAY DEVICE AND METHOD OF DRIVING THE SAME USING REFRESH-RATE-DEPENDENT ENABLE SCAN SIGNAL WIDTH

CROSS-REFERENCE TO RELATED APPLICATION

This application claims priority under 35 U.S.C. § 119 to Korean Patent Application No. 10-2023-0136139, filed on Oct. 12, 2023, the disclosure of which is incorporated by reference herein in its entirety.

TECHNICAL FIELD

Embodiments of the present disclosure generally relate to a display device and a method of driving the same.

DISCUSSION OF RELATED ART

As advances are made in information technology, the importance of a display device, which is a connection medium between a user and information, increases. Accordingly, display devices such as a liquid crystal display device and an organic light emitting display device are increasingly used.

Recent display devices utilize a high-speed driving function to provide users with images changed at a high frame frequency, and a low-speed driving function to provide users with images changed at a low frame frequency.

SUMMARY

Embodiments of the present disclosure provide a display device and a method of driving the same, which can provide images with similar luminances when the display device is driven at a high frequency and a low frequency.

In accordance with an embodiment of the present disclosure, there is provided a display device including at least one pixel configured to receive a voltage of an initialization power source, which is supplied to an anode electrode of a light emitting element, when an enable scan signal is supplied to a scan line, and a scan driver. The scan driver is configured to supply the enable scan signal to the scan line. The enable scan signal supplied to the scan line by the scan driver has a same width during an active area of a frame regardless of an image refresh rate, and the width of the enable scan signal supplied to the scan line is changed by the scan driver during a blank area of the frame, corresponding to the image refresh rate.

In an embodiment, the pixel includes a driving transistor configured to control an amount of current supplied to the light emitting element. A bias voltage is supplied to the driving transistor when the enable scan signal is supplied.

In an embodiment, the enable scan signal supplied by the scan driver has a first width in the blank area of the frame when the display device is driven at a first image refresh rate, and the enable scan signal supplied by the scan driver has the first width and a second width in the blank area of the frame when the display device is driven at a second image refresh rate lower than the first image refresh rate.

In an embodiment, the first image refresh rate is a driving frequency of about 10 Hz or higher, and the second image refresh rate is a driving frequency of about 1 Hz.

In an embodiment, the second width is different from the first width.

In an embodiment, the blank area when the display device is driven at the second image refresh rate includes a first period and a second period. The scan driver supplies the enable scan signal having the first width during the first period, and supply the enable scan signal having the second width during the second period.

In an embodiment, the first period is a period having a same time as the blank area of the first image refresh rate, and the second period is a period after the first period.

In an embodiment, the enable scan signal supplied by the scan driver has the first width and subsequently has the second width during the second period.

In an embodiment, the enable scan signal supplied by the scan driver has a first width in the blank area of the frame when the display device is driven at a first image refresh rate. The enable scan signal supplied by the scan driver has the first width and a second width in the blank area of the frame when the display device is driven at a second image refresh rate lower than the first image refresh rate. The enable scan signal supplied by the scan driver has the first width, the second width, and a third width in the blank area of the frame when the display device is driven at a third image refresh rate lower than the second image refresh rate.

In an embodiment, the first width, the second width, and the third width are different widths.

In an embodiment, the blank area of the second image refresh rate includes a first period and a second period. The scan driver supplies the enable scan signal having the first width during the first period, and supplies the enable scan signal having the second width during the second period.

In an embodiment, the first period is a period having a same time as the blank area of the first image refresh rate, and the second period is a period after the first period.

In an embodiment, the blank area of the third image refresh rate includes a first period, a second period, and a third period. The scan driver supplies the enable scan signal having the first width during the first period, supplies the enable scan signal having the second width during the second period, and supplies the enable scan signal having the third width during the third period.

In an embodiment, the first period and the second period correspond to a period having a same time as the blank area of the second image refresh rate, and the third period is a period after the second period.

In an embodiment, the display device further includes a timing controller configured to control the scan driver. The timing controller includes an oscillator configured to generate a clock signal, a frequency determiner configured to determine the image refresh rate, and determine a length of the blank area included in the image refresh rate, using the clock signal, and a start signal supplier configured to supply a start signal to the scan driver, corresponding to the image refresh rate and the length of the blank area, which are supplied from the frequency determiner.

In an embodiment, the start signal supplier supplies the start signal such that the width of the enable scan signal is changed corresponding to the blank area.

In accordance with an embodiment of the present disclosure, there is provided a method of driving a display device. The method includes supplying an enable scan signal having a first width during a blank area when the display device is driven at a first image refresh rate, and supplying the enable scan signal having the first width and having a second width during a blank area when the display device is driven at a second image refresh rate lower than the first image refresh rate. The first width is different from the second width.

In an embodiment, the first image refresh rate is a driving frequency of about 10 Hz or higher, and the second image refresh rate is a driving frequency of about 1 Hz.

In an embodiment, the blank area of the second image refresh rate includes a first period and a second period. The enable scan signal having the first width is supplied during the first period, and the enable scan signal having the second width is supplied during the second period.

In an embodiment, the first period is a period having a same time as the blank area of the first image refresh rate, and the second period is a period after the first period.

BRIEF DESCRIPTION OF THE DRAWINGS

The above and other features of the present disclosure will become more apparent by describing in detail embodiments thereof with reference to the accompanying drawings an embodiment.

DETAILED DESCRIPTION

Figure 1:
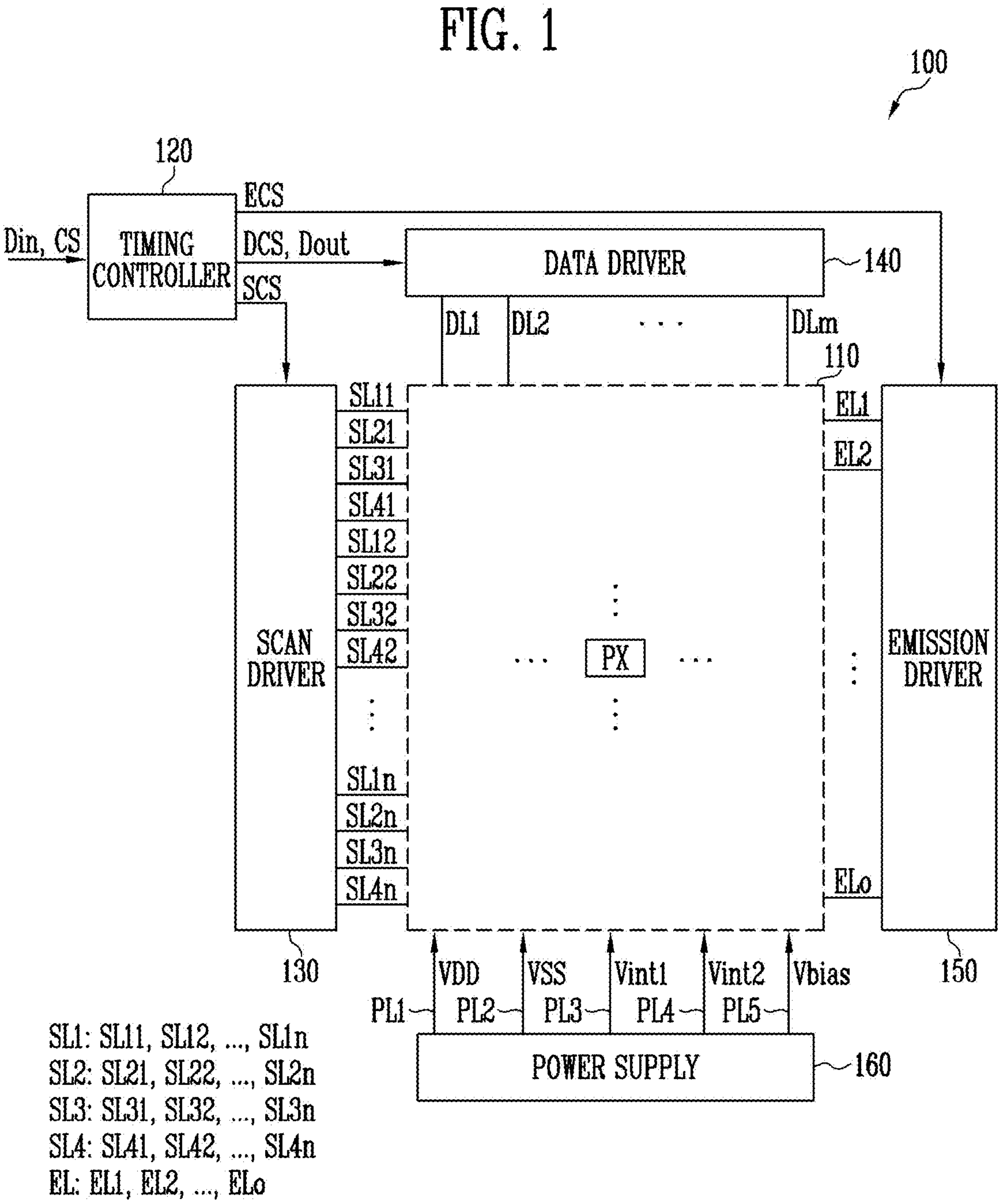
FIG. 1 is a diagram illustrating a display device in accordance with an embodiment of the present disclosure.

Embodiments of the present disclosure will be described more fully hereinafter with reference to the accompanying drawings. Like reference numerals may refer to like elements throughout the accompanying drawings.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term "about" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" may mean within one or more standard deviations as understood by one of the ordinary skill in the art. Further, it is to be understood that while parameters may be described herein as having "about" a certain value, according to embodiments, the parameter may be exactly the certain value or approximately the certain value within a measurement error as would be understood by a person having ordinary skill in the art. Other uses of these terms and similar terms to describe the relationships between components should be interpreted in a like fashion.

Some embodiments are described in the accompanying drawings in relation to functional blocks, units, and/or modules. Those skilled in the art will understand that these blocks, units, and/or modules are physically implemented by logic circuits, individual components, microprocessors, hard wire circuits, memory elements, line connection, and other electronic circuits. This may be formed by using semiconductor-based manufacturing techniques or other manufacturing techniques. In the case of blocks, units, and/or modules implemented by microprocessors or other similar hardware, the units, and/or modules are programmed and controlled by using software, to perform various functions discussed in the present disclosure, and may be selectively driven by firmware and/or software. In addition, each block, each unit, and/or each module may be implemented by dedicated hardware or by a combination dedicated hardware to perform some functions of the block, the unit, and/or the module and a processor (e.g., one or more programmed microprocessors and associated circuitry) to perform other functions of the block, the unit, and/or the module. In some embodiments, the blocks, the units, and/or the modules may be physically separated into two or more individual blocks, two or more individual units, and/or two or more individual modules without departing from the scope of the present disclosure. Also, in some embodiments, the blocks, the units, and/or the modules may be physically separated into more complex blocks, more complex units, and/or more complex modules without departing from the scope of the present disclosure.

The term "connection" between two components may include both electrical connection and physical connection, but the present disclosure is not necessarily limited thereto. For example, the term "connection" used based on circuit diagrams may mean electrical connection, and the term "connection" used based on cross-sectional and plan views may mean physical connection.

It will be understood that, although the terms "first," "second," etc. may be used herein to describe various elements, these elements should not be limited by these terms. These terms are only used to distinguish one element from another element. Thus, a "first" element discussed below could also be termed a "second" element without departing from the teachings of the present disclosure.

The present disclosure is not limited to embodiments disclosed below, and may be implemented in various forms. Each embodiment disclosed below may be independently embodied or be combined with at least another embodiment prior to being embodied.

It will be understood that when a component is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. Other words used to describe the relationships between components should be interpreted in a like fashion.

Figure 2:
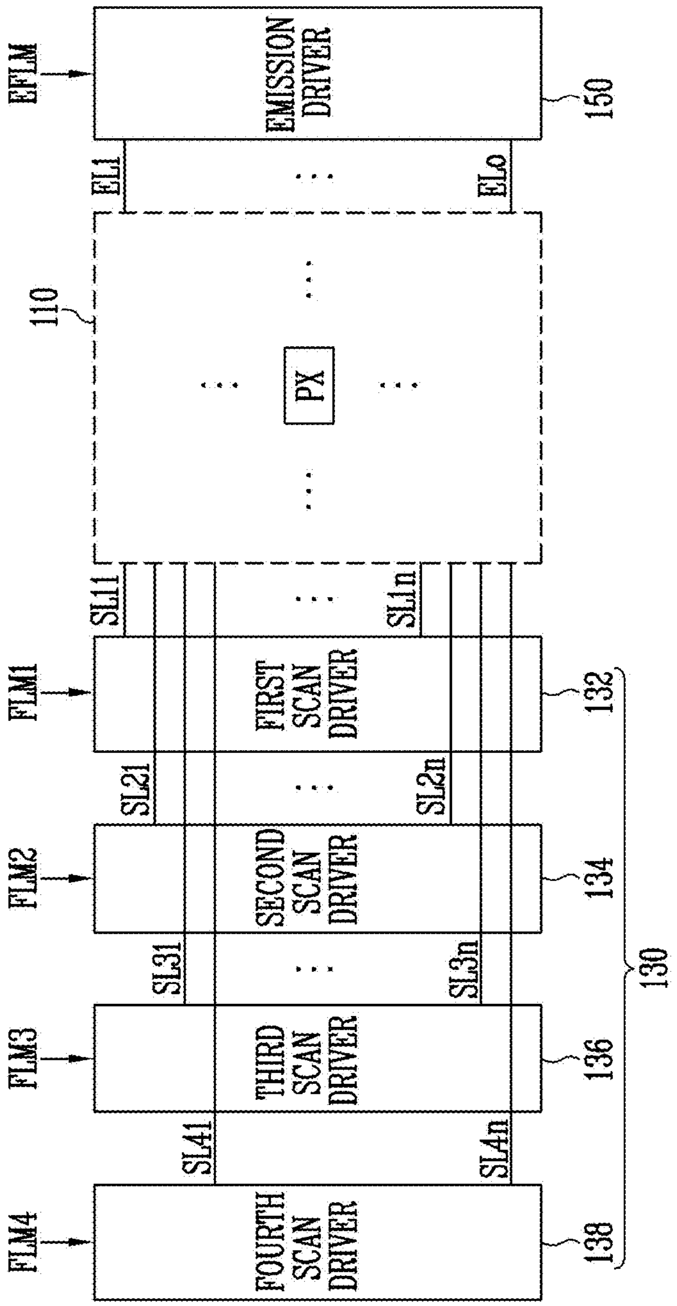
FIG. 2 is a diagram illustrating an embodiment of a scan driver and an emission driver, which are shown in FIG. 1.

FIG. 1 is a diagram illustrating a display device in accordance with an embodiment of the present disclosure. FIG. 2 is a diagram illustrating an embodiment of a scan driver and an emission driver, which are shown in FIG. 1.

Referring to FIG. 1, the display device 100 in accordance with an embodiment of the present disclosure may include a pixel unit 110 (or panel/display panel), a timing controller 120, a scan driver 130, a data driver 140, an emission driver 150, and a power supply 160. The timing controller 120 may also be referred to as a timing controller circuit, the scan driver 130 may also be referred to as a scan driver circuit, the data driver 140 may also be referred to as a data driver circuit, the emission driver 150 may also be referred to as an emission driver circuit, and the power supply 160 may also be referred to as a power supply circuit.

The display device 100 may display an image at various image refresh rates (e.g., driving frequencies or screen refresh rates) according to driving conditions. The image refresh rate means a frequency at which a data signal is written to a driving transistor of a pixel PX. For example, the image refresh rate may also be referred to as a screen scan rate or a screen refresh frequency, and may represent a frequency at which a display screen is reproduced for one second.

In an embodiment, an output frequency of the data driver 140 with respect to one horizontal line (e.g., pixels PX connected to the same scan line may be sorted as one horizontal line (or pixel row)) and/or an output frequency of a second scan driver 134 which outputs a second scan signal (or writing scan signal) may be determined corresponding to the image refresh rate. For example, an image refresh rate for driving a moving image may be a frequency of about 60 Hz or higher (e.g., about 120 Hz, about 240 Hz, or the like).

For example, the display device 100 may display an image, corresponding to various image refresh rates of about 1 Hz to about 240 Hz. However, this is merely illustrative, and the display device 100 may also display an image at an image refresh rate of, for example, about 240 Hz or higher (e.g., about 480 Hz).

The pixel unit 110 may include pixels PX connected to first scan lines SL11, SL12, . . . , and SL1*n* (collectively referred to as SL1), second scan lines SL21, SL22, . . . , and SL2*n* (collectively referred to as SL2, third scan lines SL31, SL32, . . . , and SL3*n* (collectively referred to as SL3), fourth scan lines SL41, SL42, . . . , and SL4*n* (collectively referred to as SL4), data lines DL1, DL2, . . . , and DLm, emission control lines EL1, EL2, . . . , and Elo (collectively referred to as EL), and power lines PL1, PL2, PL3, PL4 and PL5 (where each of n, m, and o is an integer of 2 or more).

In an example, a pixel PXij (see FIG. 3) located on an ith horizontal line (or pixel row) and a jth vertical line (or pixel column) may be connected to an ith first scan line SL1*i*, an ith second scan line SL2*i*, an ith third scan line SL3*i*, an ith fourth scan line SL4*i*, a kth emission control line ELk, and a jth data line DLj (where i is an integer of n or less, j is an integer of m or less, and k is an integer of o or less). Here, k is a number which is equal to i or is smaller than i. In an example, when each of the emission control lines EL1 to ELo is connected to pixels PX located on one horizontal line, k may be a number equal to i. In an example, when each of the emission control lines EL1 to ELo is connected to pixels PX located on at least two horizontal lines, k may be a number smaller than i.

Pixels PX may be selected in units of horizontal lines when a second enable scan signal is supplied to the second scan lines SL21 to SL2*n*. The pixels PX selected by the second enable scan signal may be supplied with a data signal from a data line (any one of DL1 to DLm) connected thereto. The pixels PX supplied with the data signal may generate light with a predetermined luminance, corresponding to a voltage of the data signal.

The scan driver 130 may receive a scan driving signal SCS from the timing controller 120. At least one scan start signal and clock signals, which are utilized for driving the scan driver 130, may be included in the scan driving signal SCS. The scan driver 130 may generate a first enable scan signal, the second enable scan signal, a third enable scan signal, and a fourth enable scan signal while shifting the scan start signal, corresponding to the clock signal.

To this end, the scan driver 130 may include a first scan driver 132, the second scan driver 134, a third scan driver 136, and a fourth scan driver 138 as shown in FIG. 2. At least some of the scan drivers 132, 134, 136, and 138 may be integrated into one driving circuit, one module, or the like according to a selected design.

The first scan driver 132 may receive a first scan start signal FLM1, and generate the first enable scan signal while shifting the first scan start signal FLM1, corresponding to the clock signal. The first scan driver 132 may sequentially supply the first enable scan signal to the first scan lines SL11 to SL1*n*.

In an embodiment, the first scan driver 132 may supply the first enable scan signal during a display scan period and a self-scan period of one frame. For example, the first scan driver 132 may perform scanning once during the display scan period (e.g., supply at least one first enable scan signal), and perform scanning at least once according to the image refresh rate during the self-scan period. When the image refresh rate is decreased (e.g., when a frame length is lengthened), the number of times an operation of supplying, by the first scan driver 132, the first enable scan signal to each of the first scan lines SL11 to SL1*n* is repeated in one frame period may be increased.

The second scan driver 134 may receive a second scan start signal FLM2, and generate the second enable scan signal while shifting the second scan start signal FLM2, corresponding to the clock signal. The second scan driver 134 may sequentially supply the second enable scan signal to the second scan lines SL21 to SL2*n*. In an embodiment, the second scan driver 134 may supply the second enable scan signal during the display scan period of the one frame.

The third scan driver 136 may receive a third scan start signal FLM3, and generate the third enable scan signal while shifting the third scan start signal FLM3, corresponding to the clock signal. The third scan driver 136 may sequentially supply the third enable scan signal to the third scan lines SL31 to SL3*n*. In an embodiment, the third scan driver 136 may supply the third enable scan signal during the display period of the one frame.

The fourth scan driver 138 may receive a fourth scan start signal FLM4, and generate the fourth enable scan signal while shifting the fourth scan start signal FLM4, corresponding to the clock signal. The fourth scan driver 138 may sequentially supply the fourth enable scan signal to the fourth scan lines SL41 to SL4*n*. In an embodiment, the fourth scan driver 138 may supply the fourth enable scan signal during the display period of the one frame.

The first enable scan signal, the second enable scan signal, the third enable scan signal, and the fourth enable scan signal may be set to a gate-on voltage such that transistors included in the pixels PX can be turned on.

Figure 3:
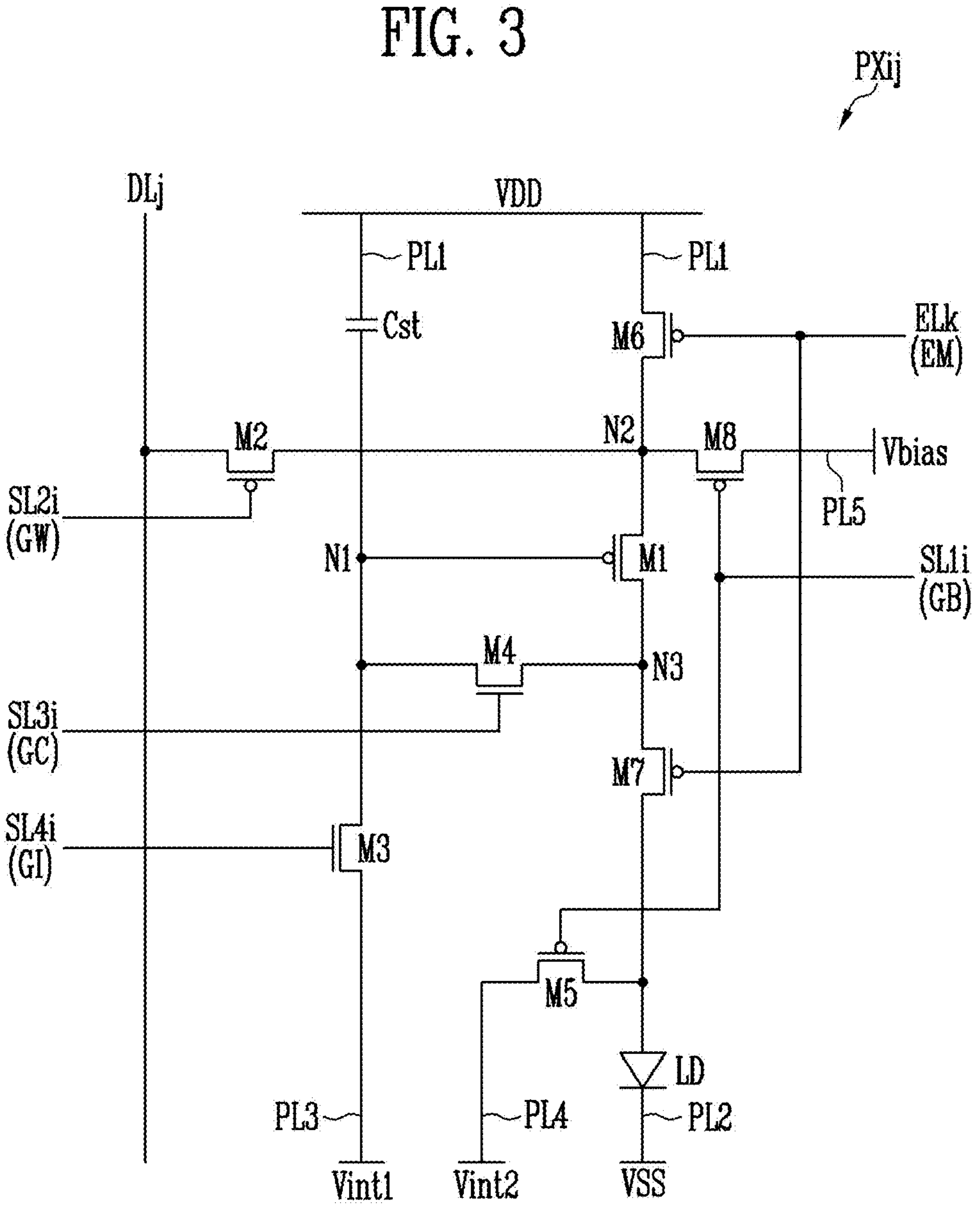
FIG. 3 is a diagram illustrating a pixel in accordance with an embodiment of the present disclosure.

In an example, each of a first enable scan signal GB and a second enable scan signal GW, which is supplied to a P-type transistor as shown in FIG. 3, may be set to a low level voltage. In an example, each of a third enable scan signal GC and a fourth enable scan signal GI, which is supplied to an N-type transistor as shown in FIG. 3, may be set to a high level voltage.

In FIG. 2, it is illustrated that the first scan driver 132, the second scan driver 134, the third scan driver 136, and the fourth scan driver 138 are respectively connected to a first scan line SL1, a second scan line SL2, a third scan line SL3, and a fourth scan line SL4. However, embodiments of the present disclosure are not limited thereto. For example, in an embodiment, at least two scan lines (e.g., at least two of SL1, SL2, SL3, and SL4) among the first scan line SL1, the second scan line SL2, the third scan line SL3, and the fourth scan line SL4 may be driven by one scan driver.

The data driver 140 may receive output data Dout and a data driving signal DCS from the timing controller 120. The data driving signal DCS may include a sampling signal and/or timing signals utilized for driving the data driver 140. The data driver 140 may generate a data signal, based on the data driving signal DCS and the output data Dout. In an example, the data driver 140 may generate an analog data signal, based on a grayscale of the output data Dout. The data driver 140 may supply the data signal in one horizontal period unit.

The emission driver 150 may receive an emission driving signal ECS from the timing controller 120. An emission start signal and clock signals, which are utilized for driving the emission driver 150, may be included in the emission driving signal ECS. The emission driver 150 may generate a disable emission control signal EM while shifting the emission start signal, corresponding to the clock signal.

As shown in FIG. 2, the emission driver 150 may receive an emission start signal EFLM, and generate the disable emission control signal EM while shifting the emission start signal EFLM, corresponding to the clock signal. The emission driver 150 may sequentially supply the disable emission control signal EM to the emission control lines EL1 to ELo. The disable emission control signal EM may be set to a gate-off voltage such that the transistors included in the pixels PX can be turned off. In an example, the disable emission control signal EM supplied to the P-type transistor as shown in FIG. 3 may be set to a high level voltage.

In an embodiment, the emission driver 150 may supply the disable emission control signal during the display scan period and the self-scan period of the one frame. For example, the emission driver 150 may perform scanning once during the display scan period, and perform scanning at least once according to the image refresh rate during the self-scan period. When the image refresh rate is decreased (e.g., when the frame length is lengthened), the number of times an operation of supplying, by the emission driver 150, the disable emission control signal to each of the emission control lines EL1 to Elo, is repeated in the one frame period may be increased.

The timing controller 120 may receive input data Din and a control signal CS from a host system through an interface. In an example, the timing controller 120 may receive the input data Din and the control signal CS from at least one of a Graphics Processing Unit (GPU), a Central Processing Unit (CPU), and an Application Processor (AP), which are included in the host system. Various signals including a clock signal may be included in the control signal CS.

The timing controller 120 may generate the scan driving signal SCS, the data driving signal DCS, and the emission driving signal ECS, based on the control signal CS. The scan driving signal SCS, the data driving signal DCS, and the emission driving signal ECS may be supplied to the scan driver 130, the data driver 140, and the emission driver 150, respectively.

The timing controller 120 may realign the input data Din to be suitable for specifications of the display device 100. Also, the timing controller 120 may generate the output data Dout by correcting the input data Din, and supply the output data Dout to the data driver 140. In an embodiment, the timing controller 120 may correct the input data Din, corresponding to an optical measurement result measured in a processing process.

The power supply 160 may generate various power sources utilized for driving the display device 100. In an example, the power supply 160 may generate a first driving power source VDD, a second driving power source VSS, a first initialization power source Vint1, a second initialization power source Vint2, and a bias power source Vbias.

The first driving power source VDD may be a power source which supplies a driving current to the pixels PX. The second driving power source VSS may be a power source which is supplied with the driving current from the pixels PX. The first driving power source VDD may be set to a voltage higher than a voltage of the second driving power source VSS during a period in which the pixels PX is set to be in an emission state.

The first initialization power source Vint1 may be a power source for initializing a gate electrode of a driving transistor included in each of the pixels PX. The first initialization power source Vint1 may be set to a voltage lower than a voltage of the data signal. The second initialization power source Vint2 may be a power source for initializing a first electrode (or anode electrode) of a light emitting element LD included in each of the pixels PX. The second initialization power source Vint2 may be set to a voltage at which the light emitting element LD is turned off. The bias power source Vbias may be a power source for applying an on-bias voltage to the driving transistor included in each of the pixels PX.

The first driving power source VDD generated by the power supply 160 may be supplied to a first power line PL1, the second driving power source VSS generated by the power supply 160 may be supplied to a second power line PL2, the first initialization power source Vint1 generated by the power supply 160 may be supplied to a third power line PL3, the second initialization power source Vint2 generated by the power supply 160 may be supplied to a fourth power line PL4, and the bias power source Vbias generated by the power supply 160 may be supplied to a fifth power line PL5. The first power line PL1, the second power line PL2, the third power line PL3, the fourth power line PL4, and the fifth power line PL5 may be commonly connected to the pixels PX, but embodiments of the present disclosure are not limited thereto.

In an embodiment, the first power line PL1 may be configured with a plurality of power lines, and the plurality of power lines may be connected to different pixels PX. In an embodiment, the second power line PL2 may be configured with a plurality of power lines, and the plurality of power lines may be connected to different pixels PX. In an embodiment, the third power line PL3 may be configured with a plurality of power lines, and the plurality of power lines may be connected to different pixels PX. In an embodiment, the fourth power line PL4 may be configured with a plurality of power lines, and the plurality of power lines may be connected to different pixels PX. In an embodiment, the fifth power line PL5 may be configured with a plurality of power lines, and the plurality of power lines may be connected to different pixels PX. That is, in an embodiment of the present disclosure, the pixels PX may be connected to any one of the plurality of power lines of the first power line PL1, any one of the plurality of power lines of the second power line PL2, any one of the plurality of power lines of the third power line PL3, any one of the plurality of power lines of the fourth power line PL4, and any one of the plurality of power lines of the fifth power line PL5.

In an embodiment of the present disclosure, the display device 100 may include a flat display device, a curved display device in which a portion of the pixel unit 110 is curved, a flexible display device in which a portion of the pixel unit 110 is folded or bent, and a stretchable display device in which a portion of the pixel unit 110 is expanded/contracted.

In an embodiment of the present disclosure, the display device is a device which displays moving images or still images, and may include portable electronic devices such as, for example, a mobile phone, a smartphone, a tablet personal computer (PC), a smartwatch, a watch phone, a portable multimedia player (PMP), a navigation system, and an ultra-mobile computer (UMPC). In an embodiment of the present disclosure, the display device 100 may include electronic devices such as, for example, a television, a notebook computer, a monitor, an advertisement board, and an Internet of Things (IOT) device.

FIG. 3 is a diagram illustrating a pixel in accordance with an embodiment of the present disclosure. In FIG. 3, a pixel located on an ith horizontal line and a jth vertical line is illustrated.

Referring to FIG. 3, a pixel PXij in accordance with an embodiment of the present disclosure may be connected to corresponding signal lines SL1*i*, SL2*i*, SL3*i*, SL4*i*, ELk, and DLj. For example, the pixel PXij may be connected to an ith first scan line SL1*i*, an ith second scan line SL2*i*, an ith third scan line SL3*i*, an ith fourth scan line SL4*i*, a kth emission control line ELk, and a jth data line DLj. In an embodiment, the pixel PXij may be further connected to the first power line PL1, the second power line PL2, the third power line PL3, the fourth power line PL4, and the fifth power line PL5.

The pixel PXij in accordance with an embodiment of the present disclosure may include a light emitting element LD and a pixel circuit that controls an amount of current supplied to the light emitting element LD.

The light emitting element LD may be connected between the first power line PL1 and the second power line PL2. In an example, a first electrode (or anode electrode) of the light emitting element LD may be electrically connected to the first power line PL1 via a seventh transistor M7, a third node N3, a first transistor M1, a second node N2, and a sixth transistor M6, and a second electrode (or cathode electrode) of the light emitting element LD may be electrically connected to the second power line PL2. The light emitting element LD may generate light with a predetermined luminance, corresponding to an amount of current supplied from the first power line PL1 to the second power line PL2 via the pixel circuit.

The light emitting element LD may be selected as an organic light emitting diode. Also, the light emitting element LD may be selected as an inorganic light emitting diode such as a micro LED (light emitting diode) or a quantum dot light emitting diode. Also, the light emitting element LD may be an element configured with a combination of an organic material and an inorganic material. In FIG. 3, it is illustrated that the pixel PXij includes a single light emitting element LD. However, embodiments of the present disclosure are not limited thereto. For example, in an embodiment, the pixel PXij may include a plurality of light emitting elements LD, and the plurality of light emitting elements LD may be connected in series, parallel or series/parallel to each other.

The pixel circuit may include the first transistor M1, a second transistor M2, a third transistor M3, a fourth transistor M4, a fifth transistor M5, the sixth transistor M6, the seventh transistor M7, an eighth transistor M8, and a storage capacitor Cst.

A first electrode of the first transistor M1 (or driving transistor) may be connected to the second node N2, and a second electrode of the first transistor M1 may be connected to the third node N3. In addition, a gate electrode of the first transistor M1 may be connected to a first node N1. The first transistor M1 may control an amount of current supplied from the first driving power source VDD to the second driving power source VSS via the light emitting element LD, corresponding to a voltage of the first node N1.

The second transistor M2 may be connected between the data line DLj and the second node N2. In addition, a gate electrode of the second transistor M2 may be electrically connected to the second scan line SL2*i*. The second transistor M2 may be turned on when a second enable scan signal GW is supplied to the second scan line SL2*i*, to electrically connect the data line DLj and the second node N2 to each other.

A first electrode of the third transistor M3 may be connected to the first node N1, and a second electrode of the third transistor M3 may be electrically connected to the third power line PL3. In addition, a gate electrode of the third transistor M3 may be electrically connected to the fourth scan line SL4*i*. The third transistor M3 may be turned on when a fourth enable scan signal GI is supplied to the fourth scan line SL4*i*, to supply the voltage of the first initialization power source Vint1 to the first node N1.

The fourth transistor M4 may be connected between the first node N1 and the third node N3. In addition, a gate electrode of the fourth transistor M4 may be electrically connected to the third scan line SL3*i*. The fourth transistor M4 may be turned on when a third enable scan signal GC is supplied to the third scan line SL3*i*, to electrically connect the first node N1 and the third node N3 to each other. That is, when the fourth transistor M4 is turned on, the first transistor M1 may be connected in a diode form.

A first electrode of the fifth transistor M5 may be electrically connected to the first electrode of the light emitting element LD, and a second electrode of the fifth transistor M5 may be electrically connected to the fourth power line PL4. In addition, a gate electrode of the fifth transistor M5 may be electrically connected to the first scan line SL1*i*. The fifth transistor M5 may be turned off when a first enable scan signal GB is supplied to the first scan line SL1*i*, to supply the voltage of the second initialization power source Vint2 to the first electrode of the light emitting element LD.

When the voltage of the second initialization power source Vint2 is supplied to the first electrode of the light emitting element LD, a parasitic capacitor of the light emitting element LD may be discharged. As a residual voltage charged in the parasitic capacitor of the light emitting element LD is discharged (or removed), unintended minute emission can be prevented or reduced. Thus, the black expression ability of the pixel PXij can be improved.

A first electrode of the sixth transistor M6 may be electrically connected to the first power line PL1, and a second electrode of the sixth transistor M6 may be connected to the second node N2. In addition, a gate electrode of the sixth transistor M6 may be electrically connected to the emission control line ELk. The sixth transistor M6 may be turned off when a disable emission control signal EM is supplied to the emission control line ELk, and be turned on when an enable emission control signal EM is supplied to the emission control line ELk.

The seventh transistor M7 may be connected between the third node N3 and the first electrode of the light emitting element LD. In addition, a gate electrode of the seventh transistor M7 may be electrically connected to the emission control line ELk. The seventh transistor M7 may be turned off when the disable emission control signal EM is supplied to the emission control line ELk, and be turned on when the enable emission control signal EM is supplied to the emission control line ELk.

A first electrode of the eighth transistor M8 (or bias transistor) may be electrically connected to the fifth power line PL5, and a second electrode of the eighth transistor M8 may be connected to the second node N2. In addition, a gate electrode of the eighth transistor M8 may be electrically connected to the first scan line SL1*i*. The eighth transistor M8 may be turned on when the first enable scan signal GB is supplied to the first scan line SL1*i*, to electrically connect the fifth power line PL5 and the second node N2 to each other.

The storage capacitor Cst may be connected between the first power line PL1 and the first node N1. The storage capacitor Cst may store a voltage applied to the first node N1.

In an embodiment, the first transistor M1, the second transistor M2, the fifth transistor M5, the sixth transistor M6, the seventh transistor M7, and the eighth transistor M8 may be implemented with a poly-silicon semiconductor transistor. For example, the first transistor M1, the second transistor M2, the fifth transistor M5, the sixth transistor M6, the seventh transistor M7, and the eighth transistor M8 may include a poly-silicon semiconductor layer formed as an active layer (channel) through a low temperature polysilicon (LTPS) process. In addition, the first transistor M1, the second transistor M2, the fifth transistor M5, the sixth transistor M6, the seventh transistor M7, and the eighth transistor M8 may be implemented with a P-type transistor (e.g., a PMOS transistor). Accordingly, a gate-on voltage at which the first transistor M1, the second transistor M2, the fifth transistor M5, the sixth transistor M6, the seventh transistor M7, and the eighth transistor M8 are turned on may have a logic low level. Since the poly-silicon semiconductor transistor provides a high response speed, the poly-silicon semiconductor transistor may be applied to a switching element that operates with a fast switching.

In an embodiment, the third transistor M3 and the fourth transistor M4 may be formed with an oxide semiconductor transistor. For example, the third transistor M3 and the fourth transistor M4 may be implemented with an N-type oxide semiconductor transistor (e.g., an NMOS transistor), and include an oxide semiconductor layer as an active layer. Accordingly, a gate-on voltage at which the third transistor M3 and the fourth transistor M4 are turned on may have a logic high level.

The oxide semiconductor transistor can be formed through a low temperature process, and have a charge mobility lower than a charge mobility of the poly-silicon semiconductor transistor. That is, the oxide semiconductor transistor has an excellent off-current characteristic. Thus, when the third transistor M3 and the fourth transistor M4 are implemented with the oxide semiconductor transistor, leakage current from the first node N1 according to low frequency driving can be minimized or reduced, and accordingly, display quality can be improved.

Figure 4:
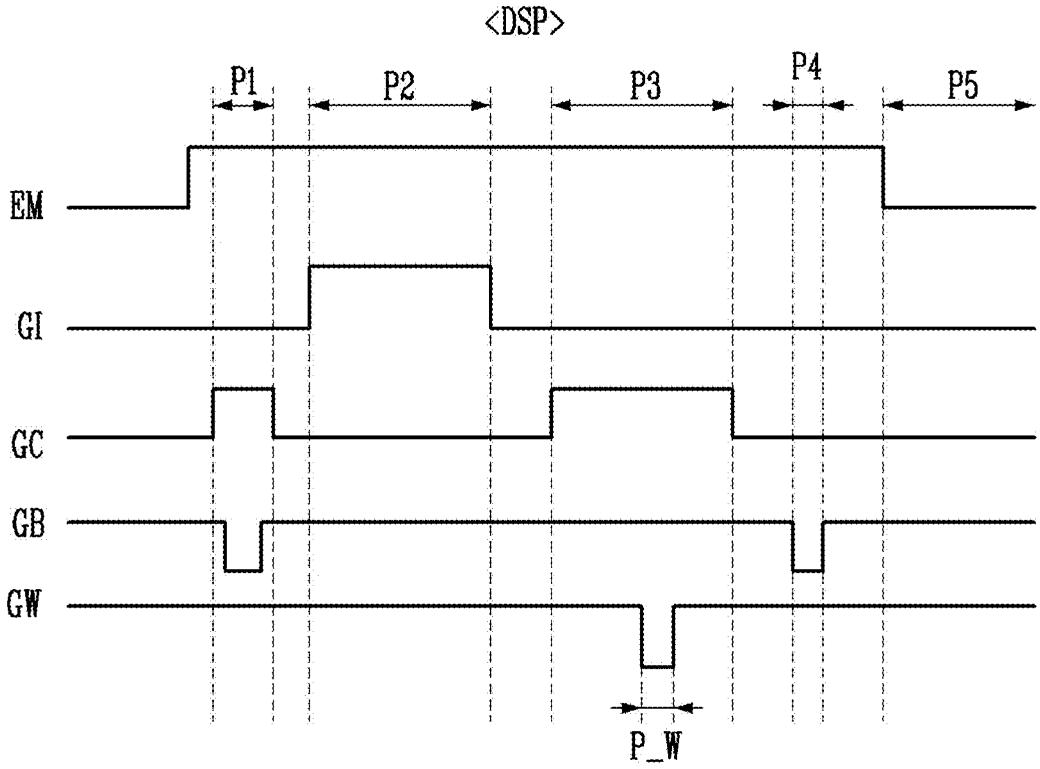
FIG. 4 is a waveform diagram illustrating an embodiment of a method of driving the pixel shown in FIG. 3 during a display scan period.

FIG. 4 is a waveform diagram illustrating an embodiment of a method of driving the pixel shown in FIG. 3 during a display scan period. The display scan period may be included in an active area of a frame.

Referring to FIGS. 3 and 4, the display scan period DSP may include a first period P1, a second period P2, a third period P3, a fourth period P4, and a fifth period P5. The first period P1 to the fourth period P4 may be set as a non-emission period, and the fifth period P5 may be set as an emission period.

During the first period P1 to the fourth period P4, the disable emission control signal EM may be supplied to the emission control line ELk. When the disable emission control signal EM is supplied to the emission control line ELk, the sixth transistor M6 and the seventh transistor M7 may be turned off. When the sixth transistor M6 and the seventh transistor M7 are turned off, an electric connection between the first power line PL1 and the light emitting element LD may be blocked, and accordingly, the light emitting element LD may be set to be in a non-emission state.

During the first period P1, the first enable scan signal GB may be supplied to the first scan line SL1*i*, and the third enable scan signal GC may be supplied to the third scan line SL3*i*. When the third enable scan signal GC is supplied, the fourth transistor M4 may be turned on, and accordingly, the first transistor M1 may be connected in the diode form. When the first enable scan signal GB is supplied, the fifth transistor M5 and the eighth transistor M8 may be turned on.

When the fifth transistor M5 is turned on, the voltage of the second initialization power source Vint2 may be supplied to the first electrode of the light emitting element LD, and accordingly, the light emitting element LD may be initialized. When the eighth transistor M8 is turned on, the voltage of the bias power source Vbias may be supplied to the second node N2. Since the fourth transistor M4 is set to be in a turn-on state, the voltage of the bias power source Vbias may be supplied to the first node N1 via the second node N2 and the third node N3. A voltage difference between the second node N2 and the third node N3 may be decreased to a threshold voltage level of the first transistor M1. In an example, the first transistor M1 may be set to be in an off-bias state.

During the second period P2, the fourth enable scan signal GI may be supplied to the fourth scan line SL4*i*. When the fourth enable scan signal GI is supplied to the fourth scan line SL4*i*, the third transistor M3 may be turned on. When the third transistor M3 is turned on, the voltage of the first initialization power source Vint1 of the third power line PL3 may be supplied to the first node N1.

During the third period P3, the third enable scan signal GC may be supplied to the third scan line SL3*i*, and accordingly, the fourth transistor M4 may be turned on. When the fourth transistor M4 is turned on, the first transistor M1 may be diode-connected.

In a writing period P_W overlapping the third period P3, the second enable scan signal GW may be supplied to the second scan line SL2*i*. When the second enable scan signal GW is supplied to the second scan line SL2*i*, the second transistor M2 may be turned on. When the second transistor M2 is turned on, a data signal from the data line DLj may be supplied to the second node N2. Since the form in which the first transistor M1 is diode-connected is maintained by the turned-on fourth transistor M4, the first node N1 may have a voltage obtained by compensating for the threshold voltage of the first transistor M1 in the data signal.

During the fourth period P4, the first enable scan signal GB may be supplied to the first scan line SL1*i*. When the first enable scan signal GB is supplied to the first scan line SL1*i*, the fifth transistor M5 and the eighth transistor M8 may be turned on. When the fifth transistor M5 is turned on, the voltage of the second initialization power source Vint2 may be supplied to the first electrode of the light emitting element LD, and accordingly, the light emitting element LD may be initialized. When the eighth transistor M8 is turned on, the voltage of the bias power source Vbias may be supplied to the second node N2. When the voltage of the bias power source Vbias is supplied to the second node N2, the first transistor M1 may be set to be in an on-bias state.

In the fifth period P5, the enable emission control signal EM (or low level emission control signal) may be supplied to the emission control line ELk, so that the sixth transistor M6 and the seventh transistor M7 are turned on. When the sixth transistor M6 and the seventh transistor M7 are turned on, a current flowing path may be formed from the first power line PL1 to the second power line PL2 via the sixth transistor M6, the first transistor M1, the seventh transistor M7, and the light emitting element LD. A driving current corresponding to the voltage of the first node N1 may flow through the light emitting element LD according to an operation of the first transistor M1, and the light emitting element LD may emit light with a luminance corresponding to the driving current.

Figure 5:
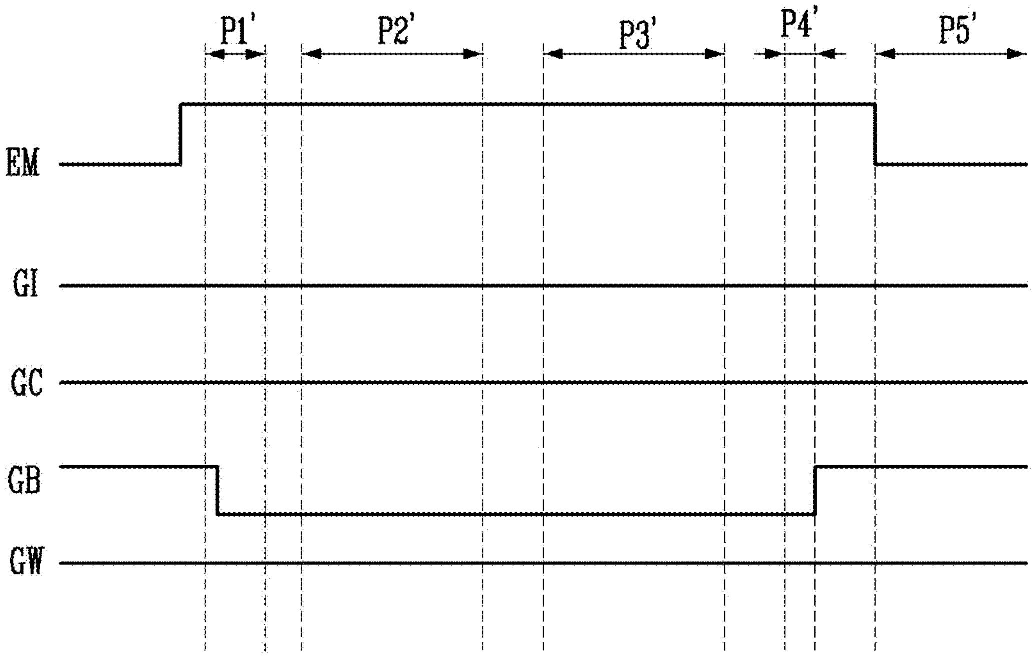
FIG. 5 is a waveform diagram illustrating an embodiment of the method of driving the pixel shown in FIG. 3 during a self-scan period.

FIG. 5 is a waveform diagram illustrating an embodiment of the method of driving the pixel shown in FIG. 3 during a self-scan period. The self-scan period SSP is a period in which light is emitted while maintaining the voltage of a data signal supplied previously, and may be a period in which an image is re-displayed without changing any frame. In an embodiment, one frame may include one display scan period DSP and at least one self-scan period SSP. The at least one self-scan period SSP may be successively disposed after the display scan period DSP. The self-scan period may be included in a blank area of the frame.

As compared with the display scan period DSP, in the self-scan period SSP, a threshold voltage compensation operation and a data writing operation may be omitted, and an operation of applying a bias voltage to the first transistor M1 (and an operation of initializing the light emitting element LD) and a light emitting operation may be performed. The self-scan period SSP may be set to have a length about equal or similar to a length of the display scan period DSP. The self-scan period SSP may include a first period P1', a second period P2', a third period P3', a fourth period P4', and a fifth period P5'.

Referring to FIGS. 3 and 5, in the first period P1' to the fourth period P4', the disable emission control signal EM may be supplied to the emission control line ELk. When the disable emission control signal EM is supplied to the emission control line ELk, the sixth transistor M6 and the seventh transistor M7 may be turned off, and accordingly, the light emitting element LD may be set to be in the non-emission state.

In an embodiment, in the first period P1' to the fourth period P4', the second enable scan signal GW, the third enable scan signal GC, and the fourth enable scan signal GI are not supplied (or disable scan signals GW, GC, and GI are supplied). Accordingly, in the first period P1' to the fourth period P4', the second transistor M2, the third transistor M3, and the fourth transistor M4 may be set to be in a turn-off state.

In the first period P1' to the fourth period P4', the first enable scan signal GB may be supplied to the first scan line SL1*i*. When the first enable scan signal GB is supplied to the first scan line SL1*i*, the fifth transistor M5 and the eighth transistor M8 may be turned on.

When the fifth transistor M5 is turned on, the voltage of the second initialization power source Vint2 may be supplied to the first electrode of the light emitting element LD, and accordingly, the light emitting element LD may be initialized. When the eighth transistor M8 is turned on, the voltage of the bias power source Vbias may be supplied to the second node N2. When the voltage of the bias power source Vbias is supplied to the second node N2, the first transistor M1 may be set to be in the on-bias state.

Since the one frame includes the display scan period DSP and the self-scan period SSP, the above-described display device 100 in accordance with an embodiment of the present disclosure can be driven at various driving frequencies (various frame frequencies).

Figure 6:
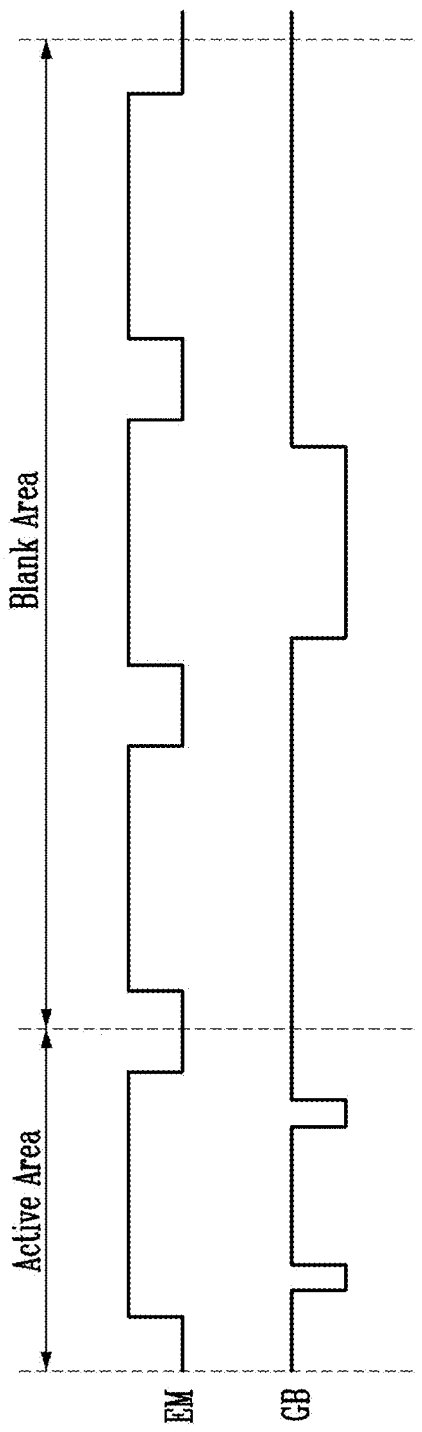
FIG. 6 is a diagram illustrating an embodiment of an emission control signal and a first scan signal, which are supplied in an active area and a blank area.

FIG. 6 is a diagram illustrating an embodiment of the emission control signal and the first scan signal, which are supplied in an active area and a blank area.

Referring to FIG. 6, during an active area (e.g., a display scan period), the disable emission control signal EM may be supplied once, and the first enable scan signal GB may be supplied twice. In addition, during a blank area (e.g., a self-scan period), the disable emission control signal EM may be supplied three times, and the first enable scan signal GB may be supplied once.

When assuming that the first enable scan signals GB supplied in the active area constitute one cycle, during one frame period, the first enable scan signal GB may be supplied with two cycles, and the disable emission control signal EM may be supplied with four cycles. In an example, regardless of the image refresh rate, the disable emission control signal EM may be supplied at a frequency of about 480 Hz, and the first enable scan signal GB may be supplied at a frequency of about 240 Hz. As the length of the blank area becomes longer (e.g., the image refresh rate becomes lower), the number of times the disable emission control signal EM and the first enable scan signal GB are supplied may be increased.

In FIG. 6, the supply of the disable emission control signal EM and the first enable scan signal GB is merely illustrative, and embodiments of the present disclosure are not limited thereto. In an example, the disable emission control signal EM and the first enable scan signal GB may be supplied to have the same cycle during the one frame period.

Images displayed in the display device 100 are to maintain similar luminances regardless of the imager refresh rate. However, a luminance difference may occur corresponding to a change in the image refresh rate as shown in Table 1.

TABLE 1

| Sample | 10 Hz | 1 Hz |
|---|---|---|
| #1 | 0.28% | 5.18% |
| #2 | 0.31% | 3.26% |
| #3 | 0.31% | 6.56% |
| #4 | 0.11% | 6.45% |
| #5 | 0.06% | 1.75% |
| #6 | 0.55% | 0.55% |
| #7 | 0.29% | 0.92% |
| #8 | 0.22% | 0.89% |

TABLE 1-continued

| Sample | 10 Hz | 1 Hz |
|---|---|---|
| #9 | 0.11% | 1.49% |
| #10 | 0.34% | 0.00% |

In Table 1, #1 to #10 mean different display panels. In Table 1, 10 Hz and 1 Hz mean that each display panel is driven at image refresh rates of about 10 Hz and about 1 Hz. In Table 1, each portion indicated by percent (%) means a luminance difference obtained by being compared with when each display panel is driven at an image refresh rate of about 120 Hz. Referring to Table 1, when each display panel (or the display device 100) is driven at about 10 Hz, the display panel has luminance differences of about 0.28%, about 0.31%, about 0.31%, about 0.11%, about 0.06%, about 0.55%, about 0.29%, about 0.22%, about 0.11%, and about 0.34%, as compared with when the display panel is driven at about 120 Hz. That is, when the display panel is driven at about 10 Hz, the display panel has a luminance difference of about 0.5% or less, as compared with when the display panel is driven at about 120 Hz. A luminance difference caused by a change in the image refresh rate is not recognized by a user, and accordingly, high display quality can be maintained.

On the other hand, when each display panel is driven at about 1 Hz, the display panel has luminance differences of about 5.18%, about 3.26%, about 6.56%, about 6.45%, about 1.75%, about 0.55%, about 1.92%, about 0.89%, about 1.49%, and about 0.00%, as compared with when the display panel is driven at about 120 Hz. That is, when the display panel is driven at about 1 Hz, a luminance difference of about 3% or more occurs in some display panels, as compared with when the display panel is driven at about 120 Hz. A luminance difference caused by a change in the image refresh rate (e.g., a change from about 120 Hz to about 1 Hz) may be recognized by the user, and accordingly, display quality may be deteriorated.

In an embodiment of the present disclosure, the scan driver 130 (or the first scan driver 132) may change a width of the first enable scan signal GB supplied in the blank area (or supplied in the self-scan period), corresponding to the image refresh rate such that the luminance difference caused by the change in the image refresh rate is minimized or reduced. In an example, when the width of the first enable scan signal GB is controlled corresponding to an image refresh rate of about 1 Hz, the luminance difference caused by the change in the image refresh rate can be minimized.

The scan driver 130 (or the first scan driver 132) may supply the first enable scan signal GB having a certain width regardless of the image refresh rate during the active area.

Figure 7:
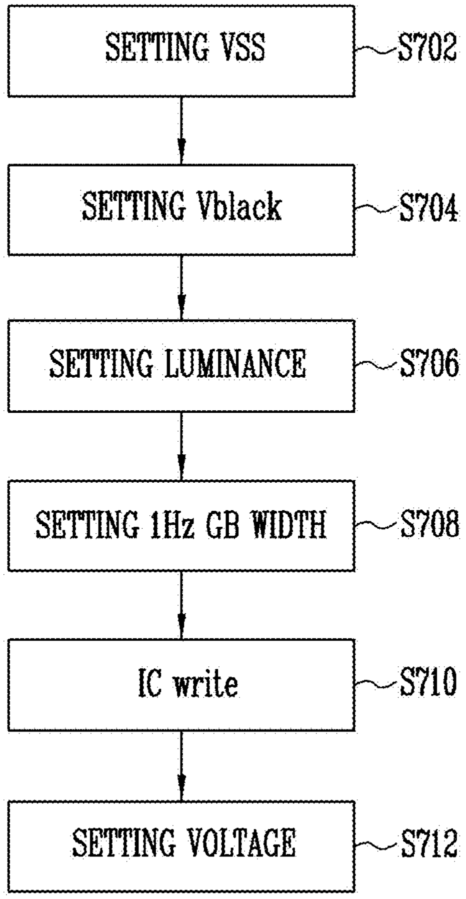
FIG. 7 is a diagram illustrating a method of tuning the display device.

FIG. 7 is a diagram illustrating a method of tuning the display device. The tuning shown in FIG. 7 may be set for each display device 100 through multi-time programming (MTP).

Referring to FIG. 7, first, the voltage of the second driving power source VSS of the display device 100 may be set (operation S702). In operation S702, after the voltage of the second driving power source VSS is set, a voltage of a black data signal may be set (operation S704). The black data signal may be set for each display device 100 by considering a channel dispersion of the display device 100. In operation S704, after the voltage of the black data signal is set, a luminance of the display device 100 may be set (or tuned) (operation S706). In an example, a gamma voltage corresponding to a data signal may be set in operation S706.

After the luminance of the display device 100 is set in operation S706, a width of the first enable scan signal GB, which corresponds to about 1 Hz, may be set (operation S708). In an example, in operation S708, a width of the first enable scan signal GB supplied in the blank area (or the self-scan period) may be set when the display device 100 is driven at about 1 Hz. In operation S708, the width of the first enable scan signal GB, which corresponds to about 1 Hz, may be set such that a luminance difference is minimized or reduced corresponding to a change in the image refresh rate. The width of the first enable scan signal GB, which is set in operation S708, may be stored in an integrated circuit (IC) (operation S710). The IC may include the timing controller 120 shown in FIG. 1.

After the width of the first enable scan signal GB is stored in the IC, a voltage of the display device 100 may be set (operation S712). In an example, a voltage of each of the first initialization power source Vint1, the second initialization power source Vint2, and the bias power source Vbias may be set in operation S712.

Figure 8:
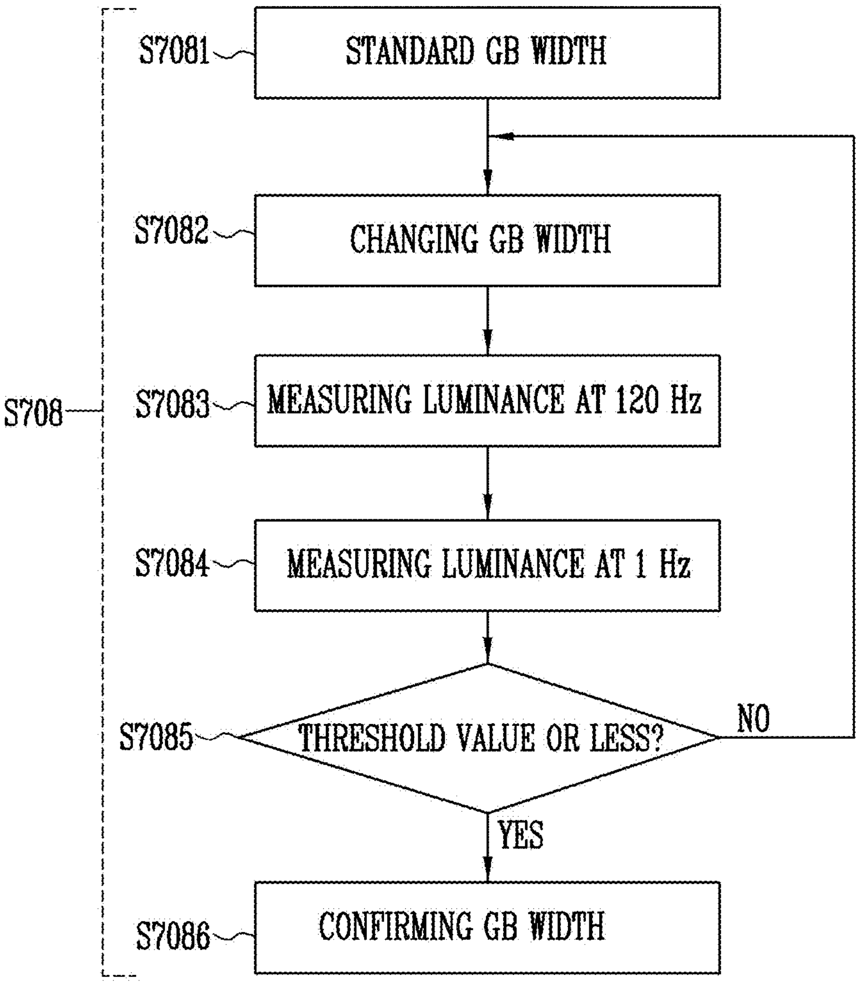
FIG. 8 is a diagram illustrating an embodiment of operation S708 shown in FIG. 7.

FIG. 8 is a diagram illustrating an embodiment of operation S708 shown in FIG. 7.

Referring to FIG. 8, first, a width of a standard first enable scan signal GB may be loaded (operation S7081). The width of the standard first enable scan signal GB may be predetermined. In an example, the width of the standard first enable scan signal GB may have the smallest width (e.g., length, area, or the like) which can be set.

After the width of the standard first enable scan signal GB is loaded in operation S7081, the width of the first enable scan signal GB may be changed (operation S7082). In an example, in operation S7082, the width of the first enable scan signal GB may be changed with a width wider than the width of the standard first enable scan signal GB.

After the width of the first enable scan signal GB is changed, a luminance of the display device 100 when the display device 100 is driven at about 120 Hz and a luminance of the display device 100 when the display device 100 is driven at about 1 Hz may be measured (operation S7083 and operation S7084). Then, it may be determined whether a luminance of the display device 100 between the luminances when the display device 100 is driven at about 120 Hz and at about 1 Hz is a threshold value or less (operation S7085).

In operation S7085, the threshold value may be predetermined. In an example, the threshold value may be set to about 1% or less. When the luminance difference is the threshold value or less in operation S7085, the changed width of the first enable scan signal GB may be confirmed (operation S7086). The width of the first enable scan signal GB, which is confirmed in operation S7086, may be stored in the IC as described in FIG. 7. When the luminance difference exceeds the threshold value in operation S7085, the width of the first enable scan signal GB may be controlled while operations S7082 to S7085 are repeated.

Figure 9:
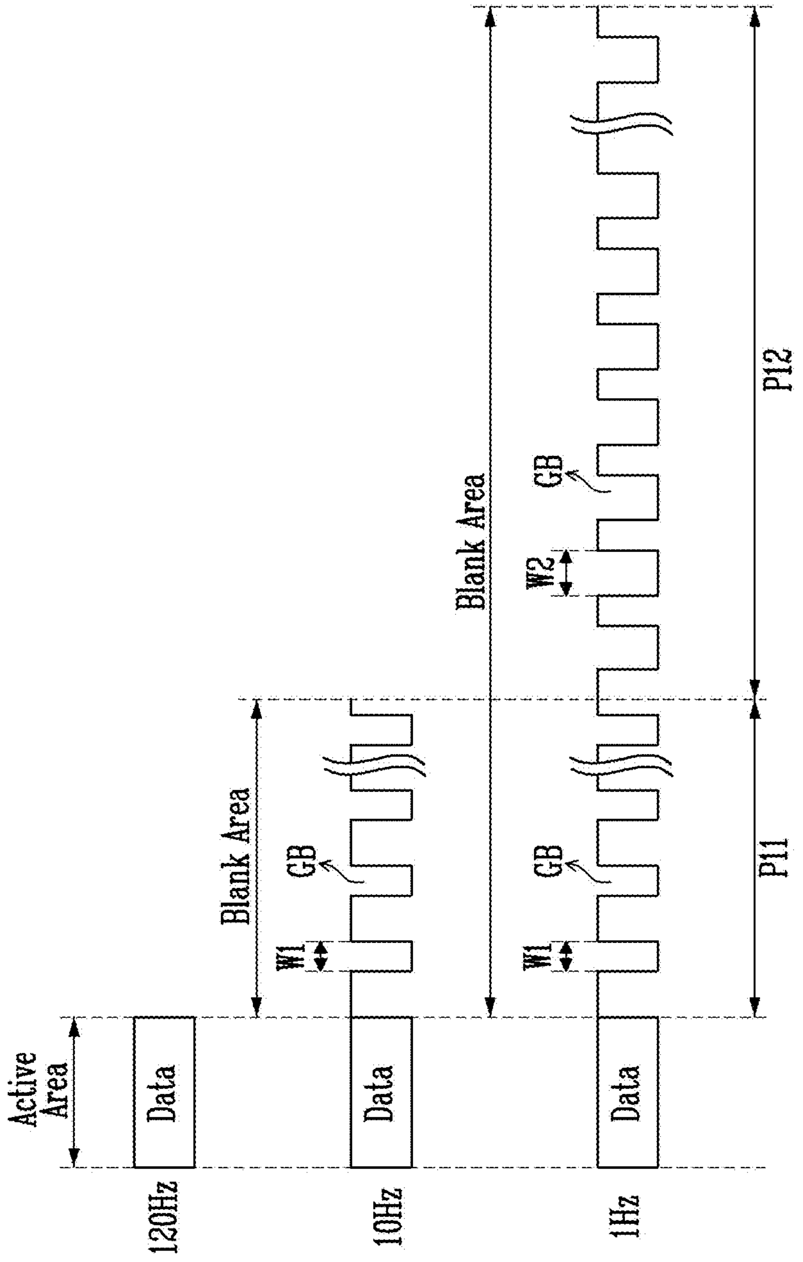
FIGS. 9 and 10 are diagrams illustrating an embodiment of a first scan signal supplied in the blank area, corresponding to an image refresh rate.
Figure 10:
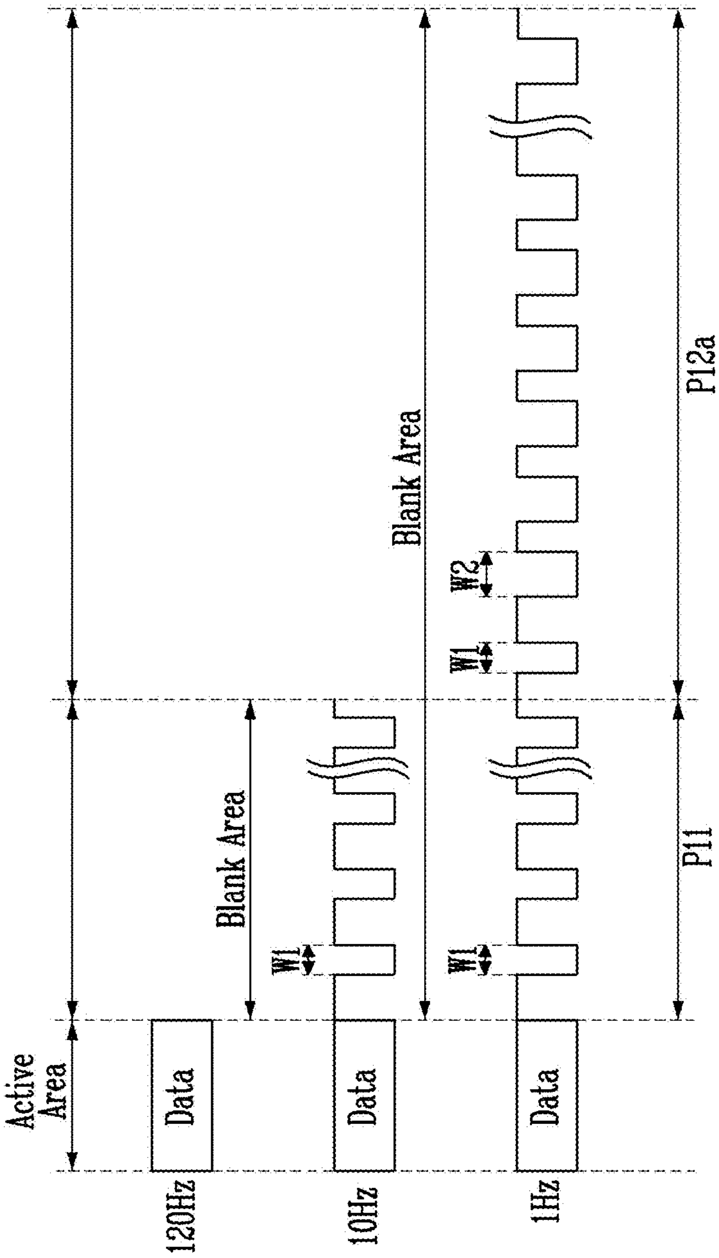

FIGS. 9 and 10 are diagrams illustrating an embodiment of the first scan signal supplied in the blank area, corresponding to the image refresh rate. In FIGS. 9 and 10, "Data" indicated in an active area (or display scan period) may mean that a data signal is supplied. The active area may have the same period regardless of the image refresh rate. In FIGS. 9 and 10, it is illustrated that any blank area is not included when the display device 100 is driven at about 120 Hz. However, embodiments of the present disclosure are not limited thereto.

Referring to FIG. 9, when the display device 100 is driven at an image refresh rate of about 10 Hz (or a first image refresh rate) (or when the display device 100 is driven at an image refresh rate of about 10 Hz or higher), the scan driver 130 (or the first scan driver 132) may supply a first enable scan signal GB having a first width W1 during a blank area (or self-scan period). In addition, when the display device 100 is driven at an image refresh rate of about 1 Hz (or a second image refresh rate), the scan driver 130 may supply a first enable scan signal GB having a first width W1 and a first enable scan signal GB having a second width W2 during a blank area. The second width W2 may be set as a width different from the first width W1. In FIGS. 9 and 10, it is illustrated that the second width W2 is a width wider than the first width W2. However, embodiments of the present disclosure are not limited thereto. For example, in an embodiment, the second width W2 may be set as a width narrower than the first width W1.

When the display device 100 is driven at the image refresh rate of about 1 Hz, the blank area may include a first period P11 and a second period P12. The first period P11 may be a period having the same time as the blank area of the image refresh rate of about 10 Hz. During the first period P11, the scan driver 130 may supply the first enable scan signal GB having the first width W1. The second period P12 may be a period after the first period 11. During the second period P12, the scan driver 130 may supply the first enable scan signal GB having the second width W2.

When the display device 100 is driven at the image refresh rate of about 1 Hz, the first enable scan signal having the second width W2 may be set such that a luminance difference is minimized or reduced as compared with another image refresh rate (e.g., the image refresh rate of about 10 Hz or higher).

At least one first enable scan signal GB having the first width W1 may be supplied during a second period P12*a* as shown in FIG. 10. In an example, at least one first enable scan signal GB having the first width W1 may be supplied at a boundary portion between the first period P11 and the second P12.

The following Table 2 illustrates a luminance difference corresponding to a change in the image refresh rate.

TABLE 2

| Sample | Horizontal Period (H) | 10 Hz | Horizontal Period (H) | 1 Hz |
|---|---|---|---|---|
| #1 | 44H | 0.28% | 56H | 0.88% |
| #2 | | 0.31% | 52H | 0.48% |
| #3 | | 0.31% | 56H | 0.66% |
| #4 | | 0.11% | 56H | 0.00% |
| #5 | | 0.06% | 36H | 0.51% |
| #6 | | 0.55% | 36H | 0.47% |
| #7 | | 0.29% | 36H | 0.11% |
| #8 | | 0.22% | 40H | 0.22% |
| #9 | | 0.11% | 40H | 0.39% |
| #10 | | 0.34% | 40H | 0.00% |

In Table 2, #1 to #10 mean different display panels. In Table 2, 10 Hz and 1 Hz mean that each display panel is driven at image refresh rates of about 10 Hz and about 1 Hz. In Table 2, each portion indicated by percent (%) means a luminance difference obtained by being compared with when each display panel is driven at an image refresh rate of about 120 Hz. In Table 2, the Horizontal Period (H) located at the left of 10 Hz represent a supply period of the first enable scan signal GB having the first width W1, which is supplied when the display device 10 is driven at the image refresh rate of about 10 Hz or higher. In Table 2, the Horizontal Period (H) located at the left of 1 Hz represent a supply period of the first enable scan signal GB having the second width W2, which is supplied when the display device 10 is driven at the image refresh rate of about 1 Hz.

Referring to Table 2, in an embodiment of the present disclosure, when each display panel (or the display device 100) is driven at about 1 Hz, the display panel has luminance differences of about 0.88%, about 0.48%, about 0.66%, about 0.00%, about 0.51%, about 0.47%, about 0.11%, about 0.22%, about 0.39%, and about 0.00%, as compared with when the display panel is driven at about 120 Hz. That is, in an embodiment of the present disclosure, although the display panel is driven at the image refresh rate of about 1 Hz, the display panel has a luminance difference of about 1% or less as compared with the image refresh rate of about 120 Hz, and accordingly, a luminance difference caused by a change in the image refresh rate can be prevented from being recognized by a user.

Figure 11:
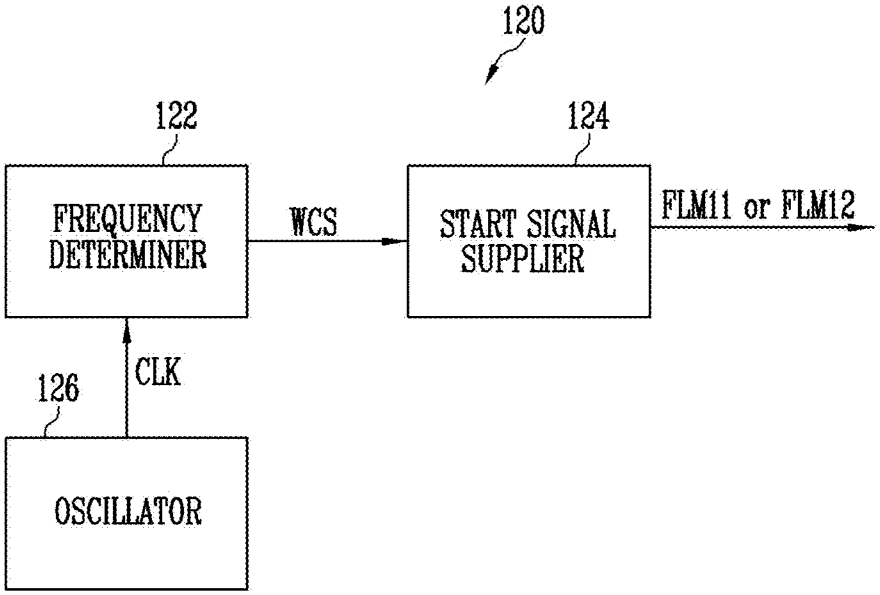
FIG. 11 is a diagram illustrating an embodiment of a timing controller shown in FIG. 1.
Figure 12:
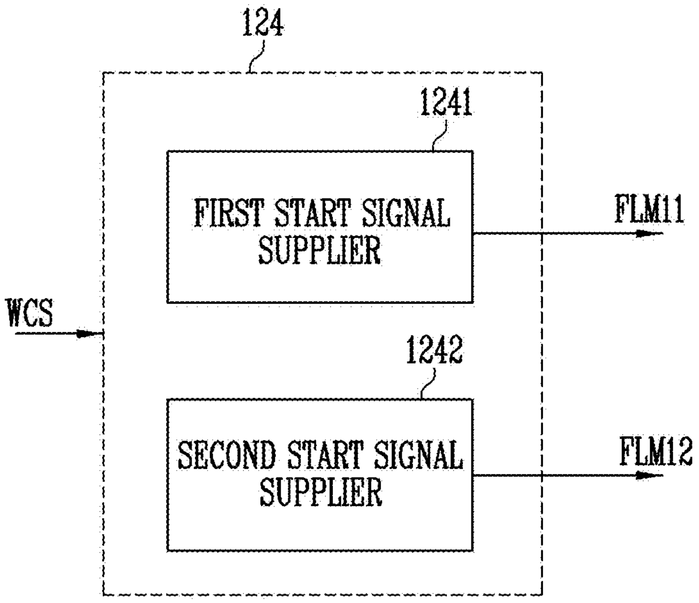
FIG. 12 is a diagram illustrating an embodiment of a start signal supplier shown in FIG. 11.

FIG. 11 is a diagram illustrating an embodiment of the timing controller shown in FIG. 1. FIG. 12 is a diagram illustrating an embodiment of a start signal supplier shown in FIG. 11. In FIG. 11, some components may be omitted for convenience of explanation.

Referring to FIG. 11, the timing controller 120 in accordance with an embodiment of the present disclosure may include a frequency determiner 122, a start signal supplier 124, and an oscillator 126. The frequency determiner 122 may also be referred to as a frequency determiner circuit, the start signal supplier 124 may also be referred to as a start signal supplier circuit, and the oscillator 126 may also be referred to as an oscillator circuit.

The oscillator 126 may generate a predetermined clock signal CLK. The oscillator 126 may be an internal oscillator of the timing controller 120.

The frequency determiner 122 may determine an image refresh rate. In an example, the frequency determiner 122 may determine the image refresh rate, corresponding to a control signal supplied from an external host. In an example, the frequency determiner 122 may determine the image refresh rate by counting the clock signal CLK. Also, frequency determiner 122 may determine a length of a blank area by counting the clock signal CLK. In an example, the frequency determiner 122 may determine the first period P11 and the second period P12, which are shown in FIG. 9, by counting the clock signal CLK.

The frequency determiner 122 determining the length of the blank area may supply, to the start signal supplier 124, a width control signal WCS corresponding to the length of the blank area. The start signal supplier 124 supplied with the width control signal WCS may supply a start signal FLM11 or FLM12 to the scan driver 130 (or the first scan driver 132).

In an embodiment, the start signal supplier 124 may supply a first start signal FLM11 when the length of the blank area is included in the first period P11 shown in FIG. 9. The first start signal FLM11 may correspond to the first width W1. In an embodiment, the start signal supplier 124 may supply a second start signal FLM12 when the length of the blank area is included in the second period P12 shown in FIG. 9. The second start signal FLM12 may correspond to the second width W2.

To this end, the start signal supplier 124 may include a first start signal supplier 1241 and a second start signal supplier 1242 as shown in FIG. 12. The first start signal supplier 1241 may supply the first start signal FLM11 to the scan driver 130, corresponding to the width control signal WCS. The second start signal supplier 1242 may supply the second start signal FLM12 to the scan driver 130, corresponding to the width control signal WCS.

Figure 13:
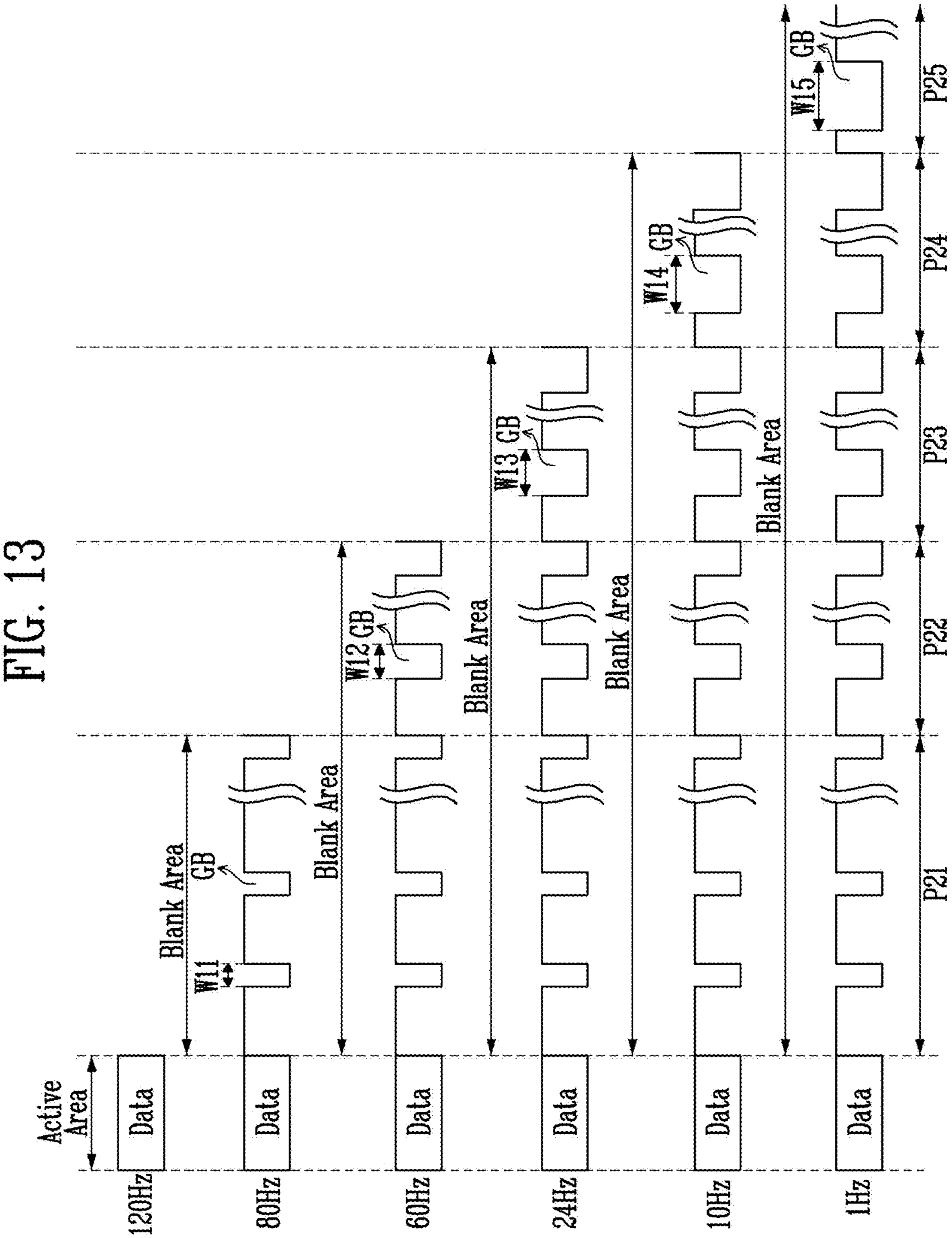
FIG. 13 is a diagram illustrating an embodiment of a first scan signal supplied in the blank area, corresponding to the image refresh rate.

FIG. 13 is a diagram illustrating an embodiment of the first scan signal supplied in the blank area, corresponding to the image refresh rate. In FIG. 13, "Data" indicated in an active area (or display scan period) may mean that a data signal is supplied. The active area may have the same period regardless of the image refresh rate. In FIG. 13, it is illustrated that any blank area is not included when the display device 100 is driven at about 120 Hz. However, embodiments of the present disclosure are not limited thereto.

Referring to FIG. 13, when the display device 100 is driven at an image refresh rate of about 80 Hz, the scan driver 130 may supply a first scan signal GB having a first width W11 during a blank area.

In an embodiment, when the display device 100 is driven at an image refresh rate of about 60 Hz, the scan driver 130 may supply a first scan signal GB having a first width W11 and a first scan signal GB having a second width W12 during a blank area. In an example, the scan driver 130 may supply the first scan signal GB having the first width W11 during a first period P21 of the blank area, and supply the first scan signal GB having the second width W12 during a second period P22 of the blank area. The second width W12 may be set as a width different from the first width W11. The first period P21 may be a period having the same time as the blank area of the image refresh rate of about 80 Hz. The second period P22 may be a period after the first period P21.

In an embodiment, when the display device 100 is driven at an image refresh rate of about 24 Hz, the scan driver 130 may supply a first scan signal GB having a first width W11, a first scan signal GB having a second width W12, and a first scan signal GB having a third width W13 during a blank area. In an example, the scan driver 130 may supply the first scan signal GB having the first width W11 during a first period P21 of the blank area, supply the first scan signal GB having the second width W12 during a second period P22 of the blank area, and supply the first scan signal GB having the third width W13 during a third period P23 of the blank area. The first period P21 and the second period P22 may correspond to a period having the same time as the blank area of the image refresh rate of about 60 Hz. The third period P23 may be a period after the second period P22. In addition, the third width W13 may be set as a width different from the first width W11 and the second width W12.

In an embodiment, when the display device 100 is driven at an image refresh rate of about 10 Hz, the scan driver 130 may supply a first scan signal GB having a first width W11, a first scan signal GB having a second width W12, a first scan signal GB having a third width W13, and a first scan signal GB having a fourth width W14 during a blank area. In an example, the scan driver 130 may supply the first scan signal GB having the first width W11 during a first period P21 of the blank area, supply the first scan signal GB having the second width W12 during a second period P22 of the blank area, supply the first scan signal GB having the third width W13 during a third period P23 of the blank area, and supply the first scan signal GB having the fourth width W14 during a fourth period P24 of the blank area. The first period P21 to the third period P23 may correspond to a period having the same time as the blank area of the image refresh rate of about 24 Hz. The fourth period P24 may be a period after the third period P23. In addition, the fourth width W14 may be set as a width different from the first width W11, the second width W12, and the third width W13.

In an embodiment, when the display device 100 is driven at an image refresh rate of about 1 Hz, the scan driver 130 may supply a first scan signal GB having a first width W11, a first scan signal GB having a second width W12, a first scan signal GB having a third width W13, a first scan signal GB having a fourth width W14, and a first scan signal GB having a fifth width W15 during a blank area. In an example, the scan driver 130 may supply the first scan signal GB having the first width W11 during a first period P21 of the blank area, supply the first scan signal GB having the second width W12 during a second period P22 of the blank area, supply the first scan signal GB having the third width W13 during a third period P23 of the blank area, supply the first scan signal GB having the fourth width W14 during a fourth period P24 of the blank area, and supply the first scan signal GB having the fifth width W15 during a fifth period P25 of the blank area. The first period P21 to the fourth period P24 may correspond to a period having the same time as the blank area of the image refresh rate of about 10 Hz. The fifth period P25 may be a period after the fourth period P24. In addition, the fifth width W15 may be set as a width different from the first width W11, the second width W12, the third width W13, and the fourth width W14.

In an embodiment of the present disclosure, which is shown in FIG. 13, first scan signals GB having different widths are supplied corresponding to the image refresh rate, e.g., the length of the blank area, and accordingly, a luminance difference when the image refresh rate is changed can be minimized or reduced.

In the display device and the method of driving the same in accordance with embodiments of the present disclosure, the width of a scan signal is changed corresponding to an image refresh rate, and as a result, display quality can be improved.

While the present disclosure has been particularly shown and described with reference to embodiments thereof, it will be understood by those of ordinary skill in the art that various changes in form and detail may be made therein without departing from the spirit and scope of the present disclosure as defined by the following claims.

What is claimed is:

1. A display device, comprising:

at least one pixel configured to receive a voltage of an initialization power source, which is supplied to an anode electrode of a light emitting element, during a width of an enable scan signal supplied to a scan line; and a scan driver configured to supply the enable scan signal to the scan line, wherein the enable scan signal supplied to the scan line by the scan driver has a same width during an active area of a single frame regardless of an image refresh rate, the width of the enable scan signal supplied to the scan line is changed by the scan driver during a blank area of the single frame, corresponding to the image refresh rate, the display device is driven at a first image refresh rate and a second image refresh rate, when the display device is driven at the second image refresh rate, the blank area of the single frame includes a first period and a second period, the enable scan signal has a first width during the first period, and the enable scan signal has the first width and subsequently has a second width, different from the first width, during the second period, and the first width and the second width are successively applied within the blank area of the single frame, wherein the at least one pixel includes a driving transistor configured to control an amount of current supplied to the light emitting element, the driving transistor including a first electrode, a second electrode and a gate electrode, and wherein during the blank area, a bias voltage is supplied to the first electrode of the driving transistor when the enable scan signal has the first width and when the enable scan signal has the second width.

2. The display device of claim 1, wherein the enable scan signal supplied by the scan driver has the first width in the blank area of the single frame when the display device is driven at the first image refresh rate, and the enable scan signal supplied by the scan driver has the first width and the second width in the blank area of the single frame when the display device is driven at the second image refresh rate, wherein the second image refresh rate is lower than the first image refresh rate.

3. The display device of claim 2, wherein the first image refresh rate is a driving frequency of about 10 Hz or higher, and the second image refresh rate is a driving frequency of about 1 Hz.

4. The display device of claim 2, wherein the scan driver supplies the enable scan signal having the first width during the first period, and supplies the enable scan signal having the second width during the second period.

5. The display device of claim 4, wherein the first period is a period having a same time as the blank area of the first image refresh rate, and the second period is a period after the first period.

6. The display device of claim 4, wherein the enable scan signal supplied by the scan driver has the first width and subsequently has the second width during the second period.

7. The display device of claim 1, wherein:

the enable scan signal supplied by the scan driver has the first width in the blank area of the single frame when the display device is driven at the first image refresh rate;

the enable scan signal supplied by the scan driver has the first width and the second width in the blank area of the single frame when the display device is driven at the second image refresh rate, which is lower than the first image refresh rate; and the enable scan signal supplied by the scan driver has the first width, the second width, and a third width in the blank area of the single frame when the display device is driven at a third image refresh rate lower than the second image refresh rate.

8. The display device of claim 7, wherein the first width, the second width, and the third width are different widths.

9. The display device of claim 7, wherein the scan driver supplies the enable scan signal having the first width during the first period, and supplies the enable scan signal having the second width during the second period.

10. The display device of claim 9, wherein the first period is a period having a same time as the blank area of the first image refresh rate, and the second period is a period after the first period.

11. The display device of claim 7, wherein the blank area of the third image refresh rate includes a first period, a second period, and a third period, and wherein the scan driver supplies the enable scan signal having the first width during the first period, supplies the enable scan signal having the second width during the second period, and supplies the enable scan signal having the third width during the third period.

12. The display device of claim 11, wherein the first period and the second period correspond to a period having a same time as the blank area of the second image refresh rate, and the third period is a period after the second period.

13. The display device of claim 1, further comprising:

a timing controller configured to control the scan driver, wherein the timing controller includes:

an oscillator configured to generate a clock signal;

a frequency determiner configured to determine the image refresh rate, and determine a length of the blank area included in the image refresh rate, using the clock signal; and a start signal supplier configured to supply a start signal to the scan driver, corresponding to the image refresh rate and the length of the blank area, which are supplied from the frequency determiner.

14. The display device of claim 13, wherein the start signal supplier supplies the start signal such that the width of the enable scan signal is changed corresponding to the blank area.

15. A method of driving a display device including pixels each comprising a driving transistor configured to control an amount of current supplied to a light emitting element, the driving transistor including a first electrode, a second electrode and a gate electrode, the method comprising:

supplying an enable scan signal having a first width during a blank area when the display device is driven at a first image refresh rate; and supplying the enable scan signal having the first width and having a second width during the blank area when the display device is driven at a second image refresh rate lower than the first image refresh rate, during the blank area, supplying a bias voltage to the first electrode of the driving transistor when the enable scan signal has the first width and when the enable scan signal has the second width, wherein the first width is different from the second width, when the display device is driven at the second image refresh rate, the blank area includes a first period and a second period, the enable scan signal has the first width during the first period, and the enable scan signal has the first width and subsequently has the second width during the second period, wherein the first width and the second width are successively applied within the blank area of a single frame.

16. The method of claim 15, wherein the first image refresh rate is a driving frequency of about 10 Hz or higher, and the second image refresh rate is a driving frequency of about 1 Hz.

17. The method of claim 15, wherein the first period is a period having a same time as the blank area of the first image refresh rate, and the second period is a period after the first period.

18. An electronic device, comprising:

a display panel comprising at least one pixel configured to receive a voltage of an initialization power source, which is supplied to an anode electrode of a light emitting element, during a width of an enable scan signal supplied to a scan line; and a scan driver configured to supply the enable scan signal to the scan line, wherein the enable scan signal supplied to the scan line by the scan driver has a same width during an active area of a single frame regardless of an image refresh rate, the width of the enable scan signal supplied to the scan line is changed by the scan driver during a blank area of the single frame, corresponding to the image refresh rate, the display panel is driven at a first image refresh rate and a second image refresh rate, when the display panel is driven at the second image refresh rate, the blank area of the single frame includes a first period and a second period, the enable scan signal has a first width during the first period, and the enable scan signal has the first width and subsequently has a second width, different from the first width, during the second period, and the first width and the second width are successively applied within the blank area of the single frame, wherein the at least one pixel includes a driving transistor configured to control an amount of current supplied to the light emitting element, the driving transistor including a first electrode, a second electrode and a gate electrode, and wherein during the blank area, a bias voltage is supplied to the first electrode of the driving transistor when the enable scan signal has the first width and when the enable scan signal has the second width.

* * * * *